United States Patent
Van Greunen et al.

(10) Patent No.: US 9,363,836 B2
(45) Date of Patent: Jun. 7, 2016

(54) SECURE MANAGEMENT OF RADIO TRANSMISSIONS IN AN ENDPOINT DEVICE OF A NETWORK

(71) Applicant: Silver Spring Networks, Inc., Redwood City, CA (US)

(72) Inventors: Jana Van Greunen, Redwood City, CA (US); William E. San Filippo, III, Los Altos Hills, CA (US); Aditi Hilbert, Redwood City, CA (US)

(73) Assignee: SILVER SPRING NETWORKS, INC., Redwood City, CA (US)

( * ) Notice: Subject to any disclaimer, the term of this patent is extended or adjusted under 35 U.S.C. 154(b) by 0 days.

(21) Appl. No.: 14/242,368

(22) Filed: Apr. 1, 2014

(65) Prior Publication Data

US 2014/0295772 A1    Oct. 2, 2014

Related U.S. Application Data

(60) Provisional application No. 61/807,129, filed on Apr. 1, 2013.

(51) Int. Cl.
*H04B 7/00* (2006.01)
*H04W 76/02* (2009.01)
*H04W 12/12* (2009.01)
*H04W 12/06* (2009.01)

(52) U.S. Cl.
CPC .............. *H04W 76/02* (2013.01); *H04W 12/06* (2013.01); *H04W 12/12* (2013.01)

(58) Field of Classification Search
CPC ...... H04W 76/02; H04W 12/06; H04W 12/12
USPC ........................................ 455/410, 411, 41.2
See application file for complete search history.

(56) References Cited

U.S. PATENT DOCUMENTS

| | | | | |
|---|---|---|---|---|
| 5,960,085 A * | 9/1999 | de la Huerga | ......... | A61J 1/1437 235/380 |
| 6,101,608 A * | 8/2000 | Schmidt | ................... | H04L 12/12 713/162 |
| 6,708,224 B1 * | 3/2004 | Tsun et al. | ............ | G06F 9/4843 717/127 |
| 7,450,974 B2 * | 11/2008 | Bennett | .................... | H04L 29/06 370/350 |
| 7,746,810 B2 * | 6/2010 | Sinha | ................... | H04W 76/068 370/278 |
| 8,112,066 B2 * | 2/2012 | Ben Ayed | ............ | G06Q 20/108 455/41.1 |
| 8,498,618 B2 * | 7/2013 | Ben Ayed | ........... | H04L 63/0492 455/41.2 |
| 2003/0041238 A1 * | 2/2003 | French | .................... | H04L 29/06 713/153 |
| 2003/0097302 A1 * | 5/2003 | Overhultz | .............. | G06Q 10/02 705/14.68 |
| 2004/0114737 A1 * | 6/2004 | MacConnell | ........... | H04L 12/12 379/106.03 |
| 2004/0248556 A1 * | 12/2004 | Rickhoff | ............ | G07C 9/00857 455/411 |
| 2004/0250087 A1 * | 12/2004 | Ray | ........................ | G06F 21/602 713/189 |

(Continued)

*Primary Examiner* — April G Gonzales
(74) *Attorney, Agent, or Firm* — Buchanan Ingersoll & Rooney PC

(57) ABSTRACT

A method for managing radio transmission in an endpoint device in a network includes: receiving, at a first endpoint device, a message requesting wake up of the first endpoint device; establishing a connection between the first endpoint device to a second endpoint device connected to the network; determining, at the first endpoint device, whether a secure command is received from the second endpoint device via the established connection within a predetermined period of time; and based on the received secure command, establishing a connection between the first endpoint device and the network via radio transmission, wherein the first endpoint device is configured to turn off radio transmission if the secure command is not received within the predetermined period of time.

16 Claims, 5 Drawing Sheets

(56) References Cited

U.S. PATENT DOCUMENTS

| | | | |
|---|---|---|---|
| 2005/0091338 A1* | 4/2005 | de la Huerga | A61J 1/1437 709/217 |
| 2007/0057812 A1* | 3/2007 | Cornwall | H04Q 9/00 340/870.02 |
| 2007/0230393 A1* | 10/2007 | Sinha | H04W 76/068 370/328 |
| 2008/0065892 A1* | 3/2008 | Bailey | H04L 63/0492 713/171 |
| 2008/0091605 A1* | 4/2008 | Hughes | G06F 21/31 705/51 |
| 2008/0307093 A1* | 12/2008 | Song | H04L 12/12 709/226 |
| 2008/0310311 A1* | 12/2008 | Flammer | H04L 45/00 370/238 |
| 2008/0310377 A1* | 12/2008 | Flammer | H04L 45/34 370/338 |
| 2009/0003214 A1* | 1/2009 | Vaswani | H04L 45/00 370/236 |
| 2009/0003232 A1* | 1/2009 | Vaswani | H04L 45/00 370/252 |
| 2009/0003243 A1* | 1/2009 | Vaswani | H04L 41/0806 370/255 |
| 2009/0003356 A1* | 1/2009 | Vaswani | H04L 45/00 370/400 |
| 2009/0043911 A1* | 2/2009 | Flammer | H04L 45/00 709/238 |
| 2010/0329363 A1* | 12/2010 | Ng | H04B 3/00 375/257 |
| 2011/0215921 A1* | 9/2011 | Ben Ayed | G08B 1/08 340/539.11 |
| 2011/0252240 A1* | 10/2011 | Freedman | H04L 63/02 713/169 |
| 2011/0303310 A1* | 12/2011 | Klicpera | B05B 12/008 137/551 |
| 2011/0303311 A1* | 12/2011 | Klicpera | B05B 12/008 137/551 |
| 2012/0019379 A1* | 1/2012 | Ben Ayed | G08B 13/1436 340/539.1 |
| 2012/0163177 A1* | 6/2012 | Vaswani | H04L 45/00 370/236 |
| 2012/0166836 A1* | 6/2012 | Hardman | B60C 23/0433 713/320 |
| 2012/0254987 A1* | 10/2012 | Ge | H04L 63/0492 726/19 |
| 2013/0106616 A1* | 5/2013 | Gustafsson | H04Q 9/00 340/870.02 |
| 2013/0217332 A1* | 8/2013 | Altman | H04H 60/90 455/41.2 |
| 2013/0217333 A1* | 8/2013 | Sprigg | H04W 4/00 455/41.2 |
| 2013/0310003 A1* | 11/2013 | Sadhvani | H04W 12/06 455/411 |
| 2014/0080450 A1* | 3/2014 | Gupta | H04W 12/06 455/411 |
| 2014/0154987 A1* | 6/2014 | Lee | H04M 1/7253 455/41.2 |
| 2014/0273957 A1* | 9/2014 | Reitz | H04W 4/008 455/411 |

\* cited by examiner

SECURE MANAGEMENT OF RADIO TRANSMISSIONS IN AN ENDPOINT DEVICE OF A NETWORK

FIELD

The present disclosure relates to the secure managing of radio transmissions in an endpoint device of a network, specifically the use of messages to wake up a sleeping endpoint device and send commands to establish secure connections with the endpoint device via radio transmission.

BACKGROUND

Network systems can often consist of a large number of endpoint devices, such as meters at a household or place of business in a power distribution system. In large-scale networks, the number of endpoint devices may be in the thousands or tens of thousands. In order to monitor and maintain these devices, a large workforce is often required, which may result in a significant expenditure of resources. As a result, some networks have attempted to establish communication networks that include the endpoint devices, to enable monitoring of and communication with the devices. In some instances, such as due to the large expense and difficulty in establishing a physical network, such communication networks may feature wireless communication.

However, establishing and maintaining a wireless communication network of a large number of endpoint devices can present a number of difficulties. For example, the constant maintenance of radio communications with a plurality of endpoint devices may require significant energy, which may increase the overall expense of such a system. Constant radio transmissions to and from endpoint devices may also pose an increased threat to security of the devices or the network. Furthermore, many users may be uncomfortable with their endpoint devices constantly emitting or receiving radio transmissions, due to perceived health concerns, interference, or other issues.

Thus, it is desirable to securely manage radio transmissions in an endpoint device of a network that enables endpoint devices to be opted-in or -out of the system as needed.

SUMMARY

The present disclosure provides a description of methods and apparatuses for managing radio transmissions in an endpoint device in a network.

More particularly, a method for managing radio transmission in an endpoint device in a network includes: receiving, at a first endpoint device, a message requesting wake up of the first endpoint device; establishing a connection between the first endpoint device to a second endpoint device connected to the network; determining, at the first endpoint device, whether a secure command is received from the second endpoint device via the established connection within a predetermined period of time; and based on the received secure command, establishing a connection between the first endpoint device and the network via radio transmission, wherein the first endpoint device is configured to turn off radio transmission if the secure command is not received within the predetermined period of time or is not cryptographically valid or authorized to execute the command.

A network node configured to turn off radio transmissions when not actively connected to a network includes: a network interface for receiving a message requesting wake up; and a processor configured to establish a connection between the offline network node and a second network node connected to the network, wherein the network interface is further configured to determine whether a secure command is received from the second network node via the established connection within a predetermined period of time, and the processor is further configured to establish a connection between the offline network node and the network via radio transmission based on the received secure command, and turn off radio transmission if the secure command is not received by the network interface within the predetermined period of time.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Figure 1:
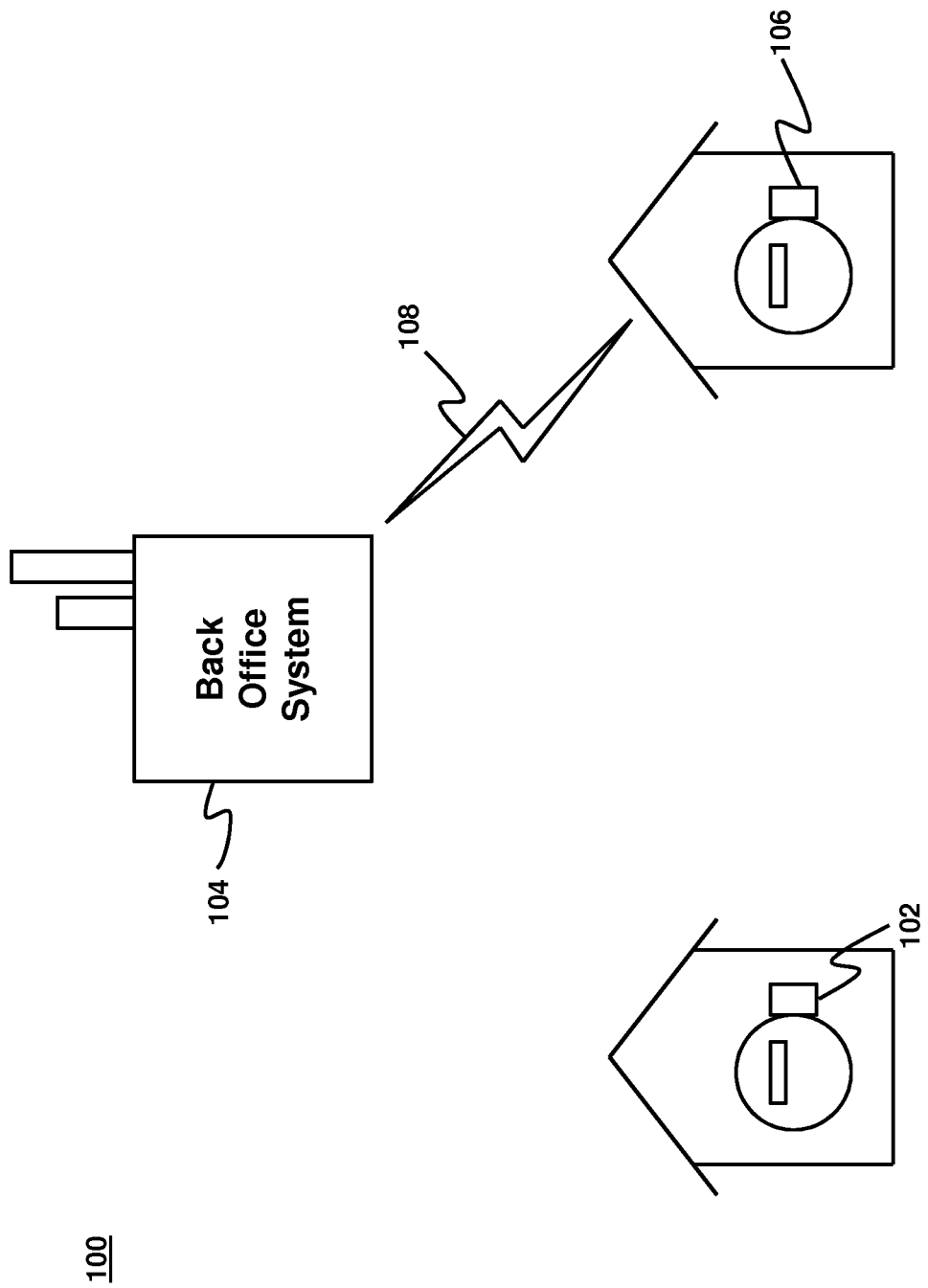
FIG. 1 is a block diagram illustrating communication via radio transmission in a network in accordance with exemplary embodiments.

FIG. 1 illustrates an exemplary embodiment of a system 100 for the managing of radio transmissions in an endpoint device.

As illustrated in FIG. 1, the system 100 may be a power distribution system, or any other type of system or network suitable for performing the functions as discussed herein. In the system 100, a back office system 104 may manage, maintain, or otherwise be a part of the system 100. The back office system 104 may be a system of a network operator or provider, such as, for example, a power utility in instances where the system 100 may be a power distribution system. The system 100 may also be comprised of a plurality of endpoint devices or network nodes, illustrated as endpoint devices 106, such as an electric meter configured to provide readings regarding electrical power usage in a power distribution system.

The back office system 104 may communicate with an endpoint device 106 using any suitable type of wireless communication as will be apparent to persons having skill in the relevant art, such as radio communication 108. The radio communication 108 may enable the back office system 104 to receive information from the endpoint device 106, such as electrical power usage, or to transmit data to the endpoint device 106, such as software updates.

The system 100 may also include an endpoint device 102. The endpoint device 102 may be an endpoint device or network node that is "asleep." While asleep, the endpoint device 102 may be in "receive-only" mode, such that it can be awakened by a received transmission, such as from the back office system 104 or endpoint device 106. The endpoint device 102 may be any suitable type of network node configured to perform the functions disclosed herein. For instance, the endpoint device 102 may include a network interface, a processor, a memory or storage, and/or other suitable components.

Figure 2:
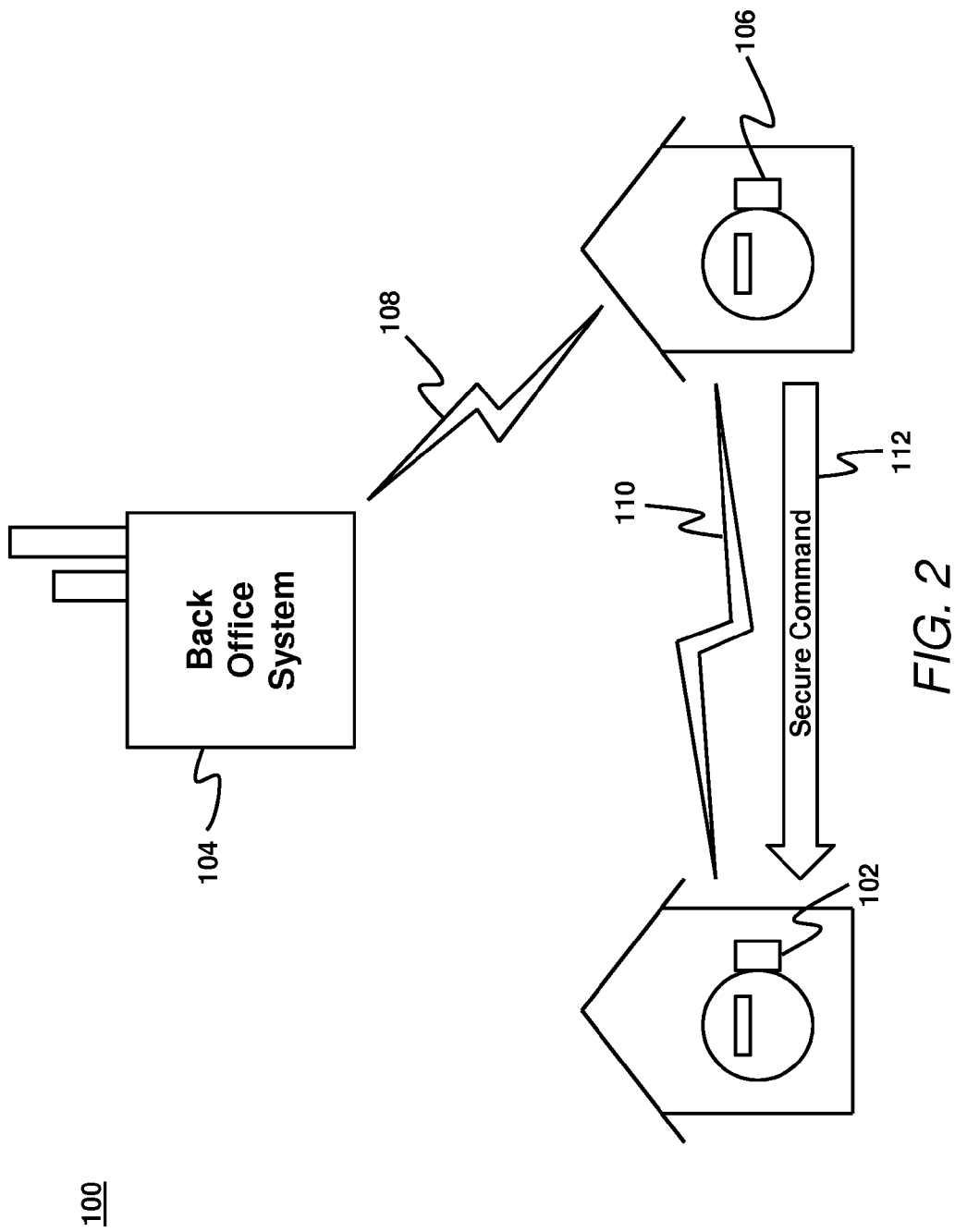
FIG. 2 is a block diagram illustrating the waking of an endpoint device in a network using radio transmission in accordance with exemplary embodiments.

As illustrated in FIG. 2, the endpoint device 106 may transmit a message via radio transmission or other suitable type of communication to the endpoint device 102 requesting wake up of the endpoint device 102. In some instances, the endpoint device 106 may transmit the message in response to a command from the back office system 104. In other instances, the message may be transmitted to the endpoint device 102 directly from the back office system 104. In some networks, such as a mesh network, the message may also be a discovery message. The network interface of the endpoint device 102 may receive the message 110. In some embodiments, the message may be a secure message. For example, the message may be encrypted using one or more methods of encryption, which may be decrypted by the processor of the endpoint device 102 upon receipt. Additional methods and systems for the transmitting and receipt of secure messages will be apparent to persons having skill in the relevant art.

Once the endpoint device 102 has received the message to wake up, the processor of the endpoint device 102 may establish communication with the endpoint device 106, such as via radio communication 110. In some embodiments, the endpoint device 106 may be in close proximity to the endpoint device 102, such as a nearby electric meter located at a neighboring household or place of business. In some instances, the endpoint device 102 may receive the message requesting wake up from a first additional network node or endpoint device 106, but may establish the radio communication 110 with a second additional network node or endpoint device 106. In one embodiment, the message requesting wake up may be sent to the endpoint device 102 by the back office system 104. In some embodiments, the wake up message may include connection data for establishing the radio communication 110 between the endpoint device 102 and endpoint device 106.

After the radio communication 110 has been established between the endpoint device 102 and the endpoint device 106, the endpoint device 106 may transmit a secure command 112 to the endpoint device 102 via the radio communication 110. The secure command 112 may be comprised of a pre-signed object or other suitable, secure data. The secure command 112 may be received by the network interface of the endpoint device 102. In some embodiments, the secure command may be transmitted to the endpoint device 102 by the back office system 104, or from the endpoint device 106 via instructions provided by the back office system 104.

Figure 3:
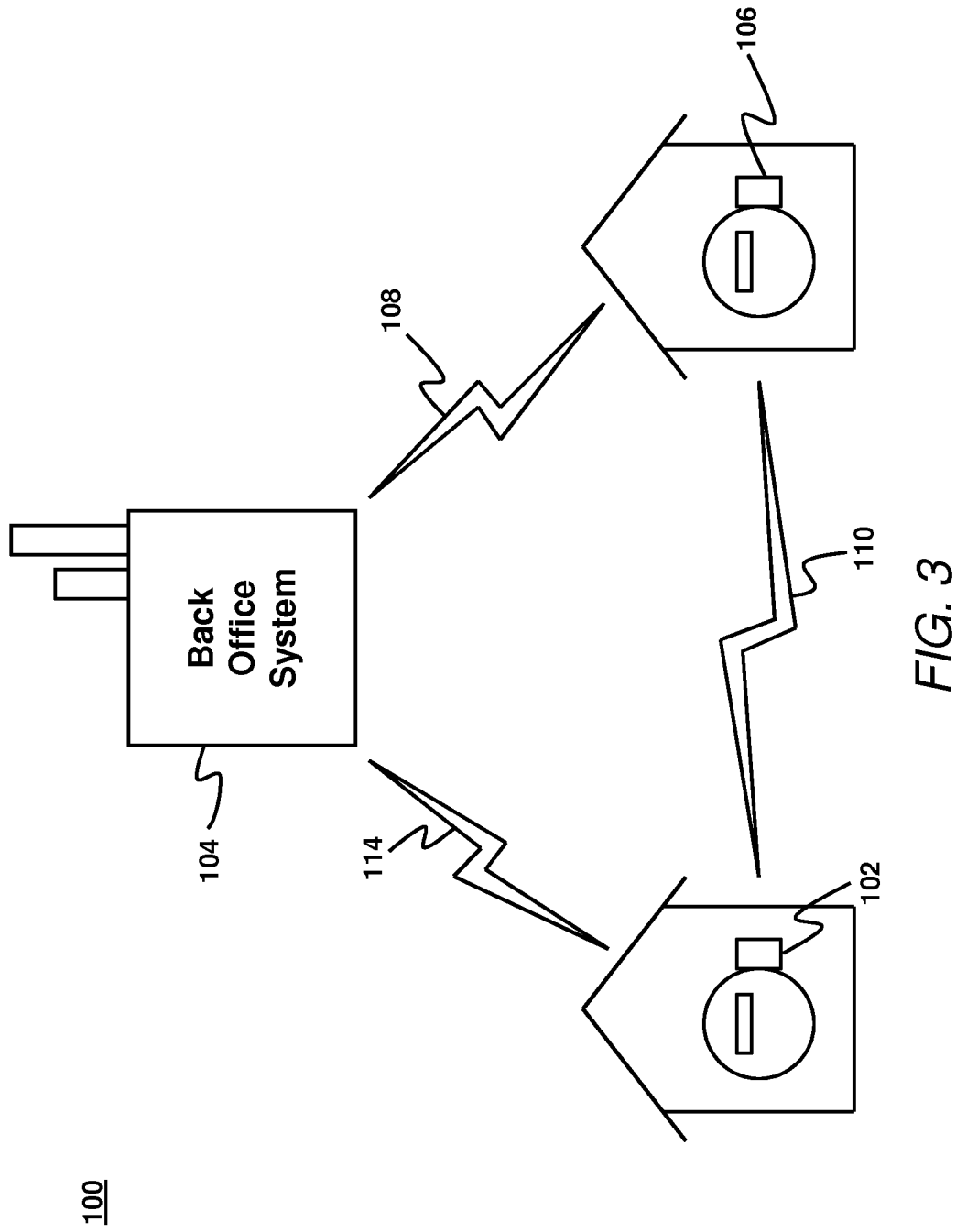
FIG. 3 is a block diagram illustrating the establishing of a secure connection between a woken endpoint device and a network in accordance with exemplary embodiments.

As illustrated in FIG. 3, the processor of the endpoint device 102 may be instructed to establish radio communication 114 or other suitable type of wireless communication with the back office system 104 in the system 100 upon receipt of the secure command 112. In some embodiments, the storage or memory of the endpoint device 102 may include instructions regarding the establishing of the radio communication 114, which may be executed by the processor of the endpoint device 102 upon receipt of the secure command 112. In some instances, the secure command 112 itself may contain data to be used by the processor of the endpoint device 102 for establishing the radio communication 114 with the back office system 104. While FIG. 3 schematically illustrates the radio communication 114 between the endpoint device 102 and the back office system 104, it will be appreciated that the communication can be implemented via intermediary nodes, such as the endpoint device 106, other endpoint devices, relays, access points, etc.

In an exemplary embodiment, the processor of the endpoint device 102 may be required to validate the data comprising the secure command 112 prior to the execution of any instructions. For example, the processor may validate a pre-signed object included in the secure command 112, may decrypt an encrypted secure command 112, or perform any other suitable type of validation as will be apparent to persons having skill in the relevant art.

In some embodiments, the secure command 112 may only be valid during a predetermined period of time. In a further embodiment, the predetermined period of time may be stored in a storage or memory of the endpoint device 102. In such an embodiment, the predetermined period of time may begin upon the receipt of the message requesting wake up by the network interface of the endpoint device 102. If the secure command 112 is not received before the predetermined period of time has expired, then the radio communication 114 may not be established.

In one embodiment, the endpoint device 102 may be configured to go back to sleep upon expiration of the predetermined period of time. For example, if the endpoint device 102 does not receive the secure message 112, the secure message 112 is not successfully validated, or the radio communication 114 not established during the predetermined period of time, then the endpoint device 102 may go back to sleep. As a result, the endpoint device 102 may only stay awake and in communication with the network upon a request and when a secure communication can be established. This may, in turn, result in significantly less expenditure of resources to maintain communications with endpoint devices 102. If used for a plurality of network nodes, a system 100 may lower its costs considerably. For example, a neighborhood consisting of hundreds of electric meters may have all but one meter remain asleep, with the one awake meter starting a process to wake all of the other meters when communication is necessary.

In some embodiments, the predetermined period of time may be included in the wake up message. In such an embodiment, the endpoint device 102 may receive the wake up message and may then stay awake and awaiting the secure command 112 for the predetermined period of time specified in the message. In some instances, the predetermined period of time may be stored locally in the endpoint device 102, but may be configurable (e.g., changeable) based on information included in the received wake up message. In other embodiments, the predetermined period of time may be included in the secure command 112. In such an embodiment, the endpoint device 102 may wake up and await the secure command 112, and, upon receipt of the secure command 112, may attempt to establish the radio communication 114 for the predetermined period of time.

In one embodiment, multiple predetermined periods of time may be used. For instance, the endpoint device 102 may wake up and remain awake for a first predetermined period of time, after which the endpoint device 102 may sleep if the secure command 112 is not received. The endpoint device 102 may also use a second predetermined period of time, which may be a period during which the secure radio communication 114 must be established. The two predetermined periods of time may thereby correspond to a period for receiving the secure command 112, with a longer period for validation thereof and establishing of the radio communication 114. Additional configurations of the endpoint device 102 regarding predetermined periods of time will be apparent to persons having skill in the relevant art.

In some embodiments, the endpoint device 102 may also be configured to sleep upon the receipt of repeated wake up messages without receiving a validated secure command 112. For example, the endpoint device 102 may wake up upon receipt of a wake up message by the network interface, and may await the secure command 112. If the endpoint device 102 receives a predetermined number of additional wake up messages and/or invalid secure commands 112 prior to receiving a valid secure command 112, the endpoint device 102 may go back to sleep. In one embodiment, the endpoint device 102 may sleep at such a time regardless of any established predetermined period of time. The predetermined number may be stored in a storage or memory of the endpoint device 102. In some instances, the endpoint device 102 may use multiple predetermined numbers, such as a predetermined number of wake up messages and a predetermined number of invalid secure commands 112 where one or both numbers must be met prior to going to sleep.

In one embodiment, the endpoint device 102 may be configured to send an alarm or alert to the originating source of the repeated wake up messages and/or secure commands 112 prior to going to sleep. In other embodiments, the endpoint device 102 may be configured to send an alert to the back office system 104 or other network node prior to going to sleep following the reaching of the predetermined number. For instance, if the endpoint device 102 receives an excessive number of invalid secure commands from the endpoint device 106, the endpoint device 102 may transmit an alert to the back office system 104 notifying the system of the actions of the endpoint device 106 and then return to sleep.

In further embodiments, the endpoint device 102 may be additionally or alternatively configured to wake up at predetermined intervals. For instance, the endpoint device 102 may be configured to wake up and begin radio transmission once a day at a predetermined time. In such an embodiment, the endpoint device 102 may be able to reconnect to the system 100 at known intervals without the need for additional wake up transmissions from the back office system 104 or endpoint device 106, such as in an effort to combat repeated invalid wake up messages and/or secure commands. In one embodiment, the endpoint device 102 may still be required to receive the secure command 112 prior to establishing the radio communication 114 after a predetermined wake up, such as to increase network security.

In some instances, one or more endpoint devices 102 may be configured to stay awake indefinitely upon receipt of a wake up message, while the remaining endpoint devices 102 may use the predetermined period of time. In such an instance, the system 100 would thereby be assured that at least one endpoint device 102 remained awake and ready to receive a secure command 112 to establish the radio communication 114. In one embodiment, an endpoint device that was configured to stay awake indefinitely may be further configured to sleep upon receipt of a sleep message.

In some instances, the endpoint device 102 may be configured to communicate with multiple networks using one or more methods of communication. For example, the endpoint device 102 may be configured to communicate with the back office system 104 or other network node of the system 100 using a cellular network, but may be configured to communicate with the endpoint device 106 via radio communication 110. In a further embodiment, the endpoint device 102 may be configured to turn off or on transmissions across each network based on instructions that may be stored locally (e.g., in the storage or memory of the endpoint device 102) or received in the wake up message, secure command 112, or in a message transmitted following establishing of the radio communication 114. For example, the endpoint device 102 may be configured to communicate with one or more network nodes via cellular communication, but may, once the radio communication 114 is established, or the wake up message received, turn off cellular communications.

Figure 4:
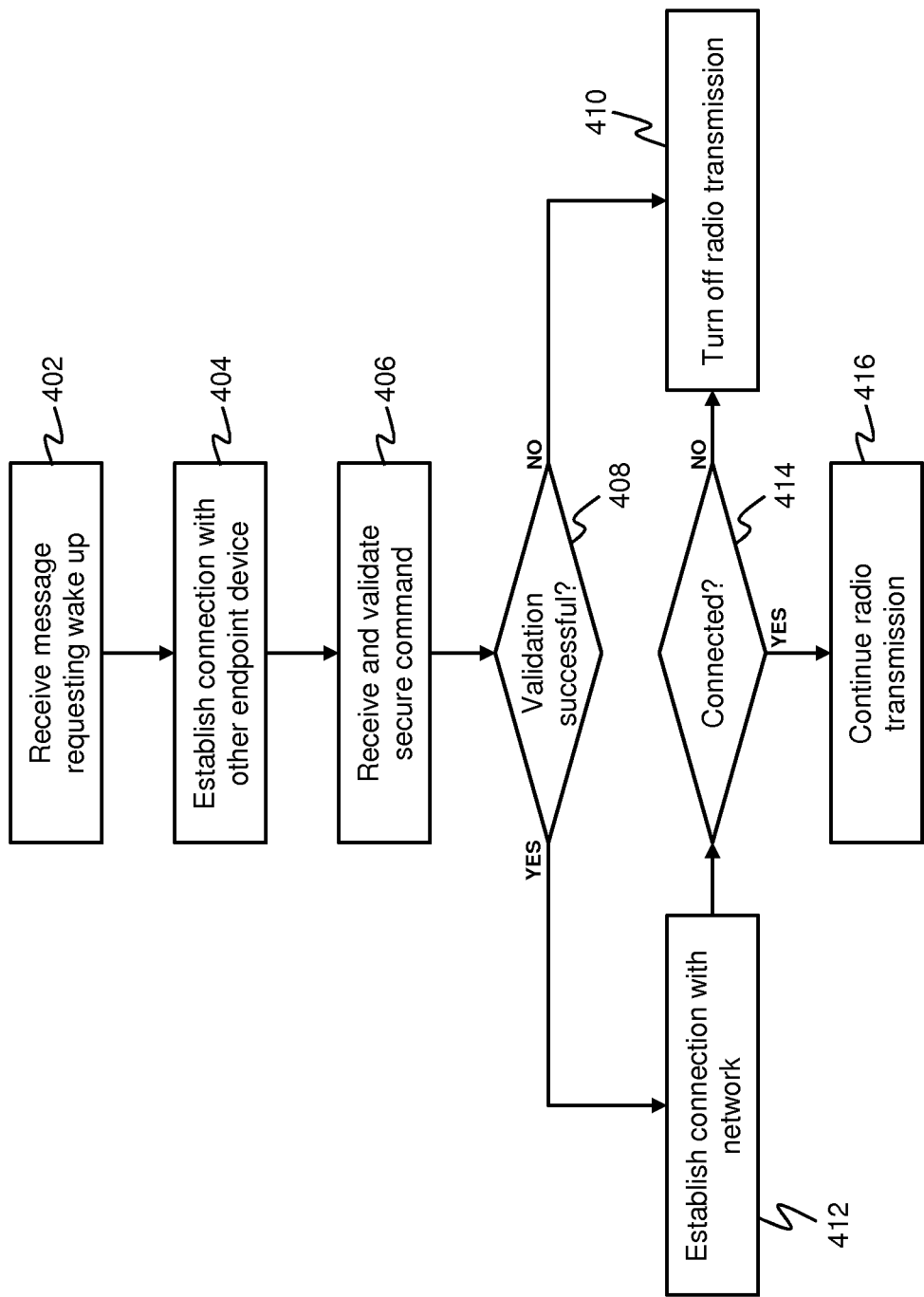
FIGS. 4 and 5 are flow charts illustrating methods for managing radio transmissions in an endpoint device in a network in accordance with exemplary embodiments.

FIG. 4 illustrates a flow chart for a method for managing radio transmission in an endpoint device, such as the endpoint device 102, in a power distribution system, such as the system 100.

In step 402, the network interface of the endpoint device 102, which may be asleep and thereby not engaging in radio transmission, may receive a message requesting wake up of the device. The waking up of the endpoint device 102 may include the initiation of radio transmission by the endpoint device 102. In step 404, a processor of the endpoint device 102 may establish a radio communication 110 with a second endpoint device 106 via the established radio transmission. In some instances, the received wake up message may originate from the second endpoint device 106.

Once the radio communication 110 has been established, then, in step 406, the second endpoint device 106 may transmit a secure command 112 to be received by the network interface of the endpoint device 102. The processor of the endpoint device 102 may then attempt validation of the received secure command 112, in step 408, using methods and systems for validation of a received secure command as will be apparent to persons having skill in the relevant art.

If the validation is unsuccessful, then, in step 410, the processor of the endpoint device 102 may cease radio transmissions. If the validation of the received secure command 112 is successful, then, in step 412, the processor of the endpoint device 102 may establish radio communication 114 with the system 100 (e.g., via the back office system 104) via a network interface. In some embodiments, the network interface used to establish the communication 114 may be a different network interface than used to receive the wake up message and/or establish radio communication 110 with the endpoint device 106.

In step 414, the processor of the endpoint device 102 may determine if the connection to the system 100 via the radio communication 114 was successful. If the connection was unsuccessful, such as if there was an error in the endpoint device 102 or back office system 104, then the process may return to step 410 where the radio transmission by the endpoint device 102 may be ceased. If the connection was successful, then, in step 416, the endpoint device 102 may remain in communication with the system 100 via the radio communication 114 and may continue radio transmission until further notice. In some embodiments, the radio transmission may continue until the expiration of the previously established period of time, an alternative period of time, or an additional predetermined period of time.

Figure 5:
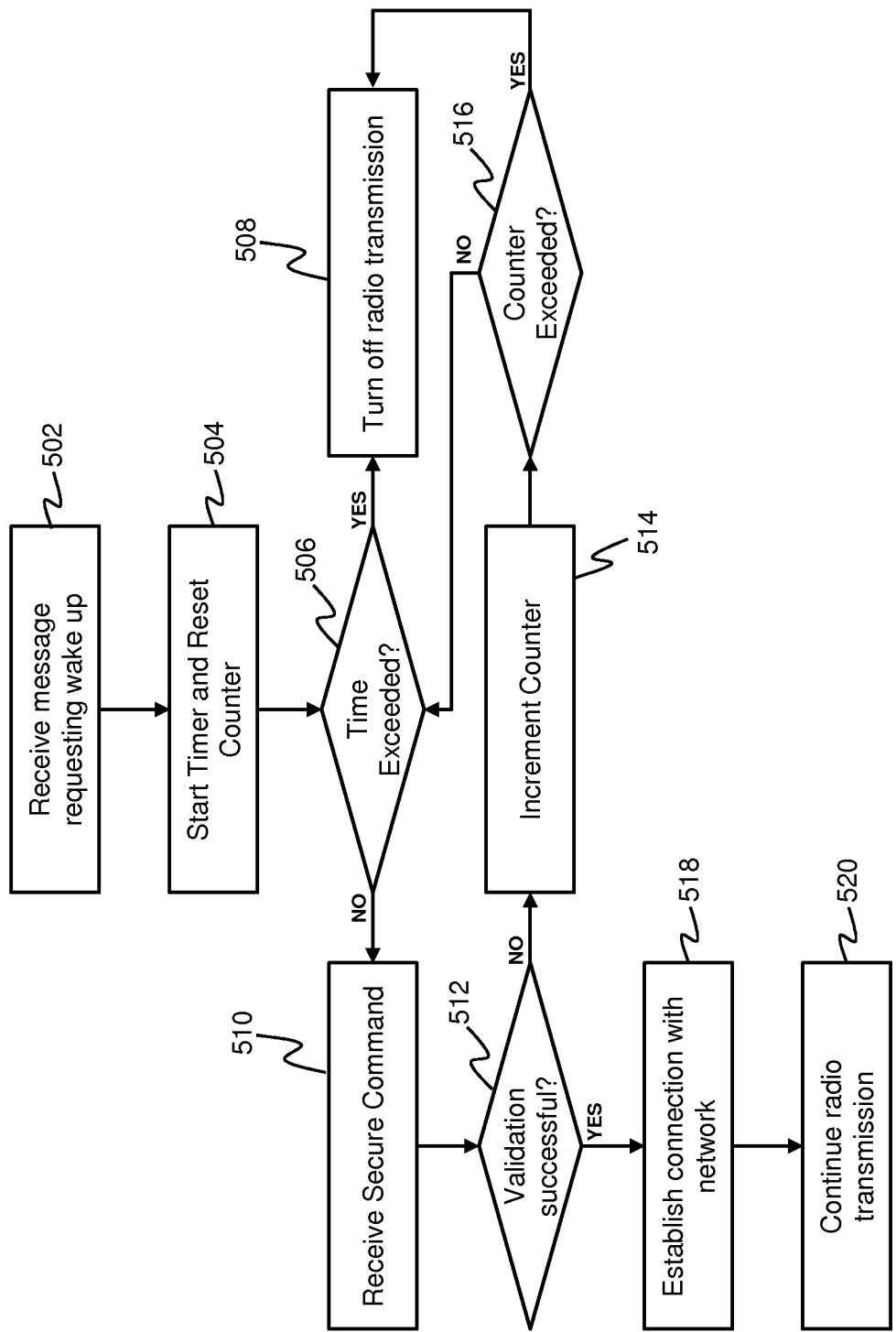

FIG. 5 illustrates a flow chart of an alternative method for managing radio transmission in an endpoint device, such as the endpoint device 102, in a power distribution system or other type of network, such as the system 100.

In step 502, the endpoint device 102 may receive the message requesting wake up. In some embodiments, the message may be received from the endpoint device 106. In other embodiments, the message may be received from the back office system 104, or may be received in response to a command provided from the back office system 104, such as to the endpoint device 106. In step 504, the endpoint device 102 may start a timer for the predetermined period of time and may reset a counter for the predetermined number of tries. The predetermined period of time may be stored locally in the memory of the endpoint device 102, or may be configured by or received in the wake up message.

In step 506, the processor of the endpoint device 102 may determine if the predetermined period of time has been exceeded based on the current value of the timer. If the predetermined period of time has been exceeded, then, in step 508, the processor may turn off radio transmission in the endpoint device 102, and the endpoint device 102 may be returned to sleep. If the predetermined period of time has not been exceeded, then, in step 510, the network interface of the endpoint device 102 may receive a secure command. The secure command may be received from the endpoint device 106, or from the back office system 104.

In step 512, the processor of the endpoint device 102 may attempt to validate the secure command. If validation of the secure command is unsuccessful, then, in step 514, the processor of the endpoint device 102 may increment the counter indicating the number of times validation of a secure command has been unsuccessful. In step 516, the processor of the endpoint device 102 may determine if the predetermined number has been exceeded based on the value of the counter, such as to determine if too many invalid secure commands have been received. If the predetermined number has been exceeded, then the method may return to step 508, where the radio transmission may be ceased and the endpoint device 102 may return to sleep.

If the predetermined number has not been exceeded, then the method may return to step 506 and continue until the predetermined period of time has expired. Once the endpoint device 102 has received a secure command that is successfully validated in step 512, then, in step 518, the endpoint device 102 may establish communication with the network, such as a power distribution system including the back office system 104 and the endpoint device 106. In step 520, the endpoint device 102 may remain in communication with the system 100 via the radio communication 114 and may continue radio transmission until further notice. In some embodiments, the radio transmission may continue until the expiration of the previously established, an alternative, or an additional, predetermined period of time In one embodiment, the predetermined number may correspond to a limit of the number of wake up messages that is to be received. In another embodiment, a second predetermined number may be used that may correspond to a limit of the number of wake up messages that is to be received. In such embodiments, the method illustrated in FIG. 5 may include an alternative or additional counter that is incremented following step 502, and the method may continue to repeat from step 502 until the predetermined number has been met. In some instances, once the predetermined number of wake up messages has been received, radio transmission from the endpoint device 102 may remain off, such as until a predetermined time and/or date (e.g., at a specific time daily as set by the back office system 104).

Techniques consistent with the present disclosure provide, among other features, methods and apparatus for managing radio transmissions in an endpoint device in a network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method of managing radio transmission in an endpoint device in a network, the method comprising:
   receiving, at a first endpoint device, a message requesting wake up of the first endpoint device;
   establishing a connection between the first endpoint device and a second endpoint device currently connected to the network;
   after the connection has been established, determining, at the first endpoint device, whether a valid secure command is received from the second endpoint device via the established connection within a predetermined period of time, said secure command including data for establishing a connection with the network; and
   based on the determination, establishing a connection between the first endpoint device and the network via radio transmission, in accordance with the data contained in the secure command, wherein
   the first endpoint device is configured to turn off radio transmission if a valid secure command is not received from the second endpoint device within the predetermined period of time.

2. The method of claim 1, further including:
   counting invalid secure commands that are received within the predetermined period of time, and
   turning off radio transmission if a threshold number of invalid secure commands are counted within the predetermined period of time.

3. The method of claim 1, wherein the secure command is a cryptographically pre-signed object.

4. The method of claim 1, wherein the message requesting wake up is received from the second endpoint device.

5. The method of claim 1, further comprising:
   cryptographically validating, by a processor of the first endpoint device, the received secure command prior to the establishing of the connection between the first endpoint device and the network.

6. The method of claim 5, wherein the connection between the first endpoint device and the network is not established, and radio transmission in the first endpoint device is turned off, upon unsuccessful validation of the received secure command.

7. The method of claim 1, further comprising identifying, in a storage of the first endpoint device, the predetermined period of time.

8. The method of claim 1, wherein the received message requesting wake up includes connection data for establishing the connection between the first endpoint device and the second endpoint device.

9. A network node configured to turn off radio transmissions when not actively connected to a network, the network node comprising:
   a network interface for receiving a message requesting wake up; and
   a processor configured to establish a connection between the network node and a second network node connected to the network, wherein
   the network interface is further configured to determine, after the connection has been established, whether a secure command is received from the second network node via the established connection within a predetermined period of time, said secure command including data for establishing a connection with the network, and
   based on the determination, the processor is further configured to
      establish a connection between the network node and the network via radio transmission, in accordance with the data contained in the received secure command, if the secure command is received with the predetermined period of time, and turn off radio transmission if the secure command is not received by the network interface within the predetermined period of time.

10. The network node of claim 9, wherein the processor is further configured to:

count invalid secure commands that are received within the predetermined period of time, and turn off radio transmission if a threshold number of invalid secure commands are counted within the predetermined period of time.

11. The network node of claim 9, wherein the secure command is a pre-signed object.

12. The network node of claim 9, wherein the message requesting wake up is received from the second network node.

13. The network node of claim 9, wherein the processor is further configured to validate the secure command prior to the establishing of the connection between the network node and the network.

14. The network node of claim 13, wherein the processor is further configured to turn off radio transmission and not establish the connection between the network node and the network upon unsuccessful validation of the received secure command.

15. The network node of claim 9, further comprising:

a storage device configured to store data comprising the predetermined period of time.

16. The network node of claim 9, wherein the received message requesting wake up includes connection data for establishing the connection between the network node and the second network node.

* * * * *